UNITED STATES PATENT OFFICE.

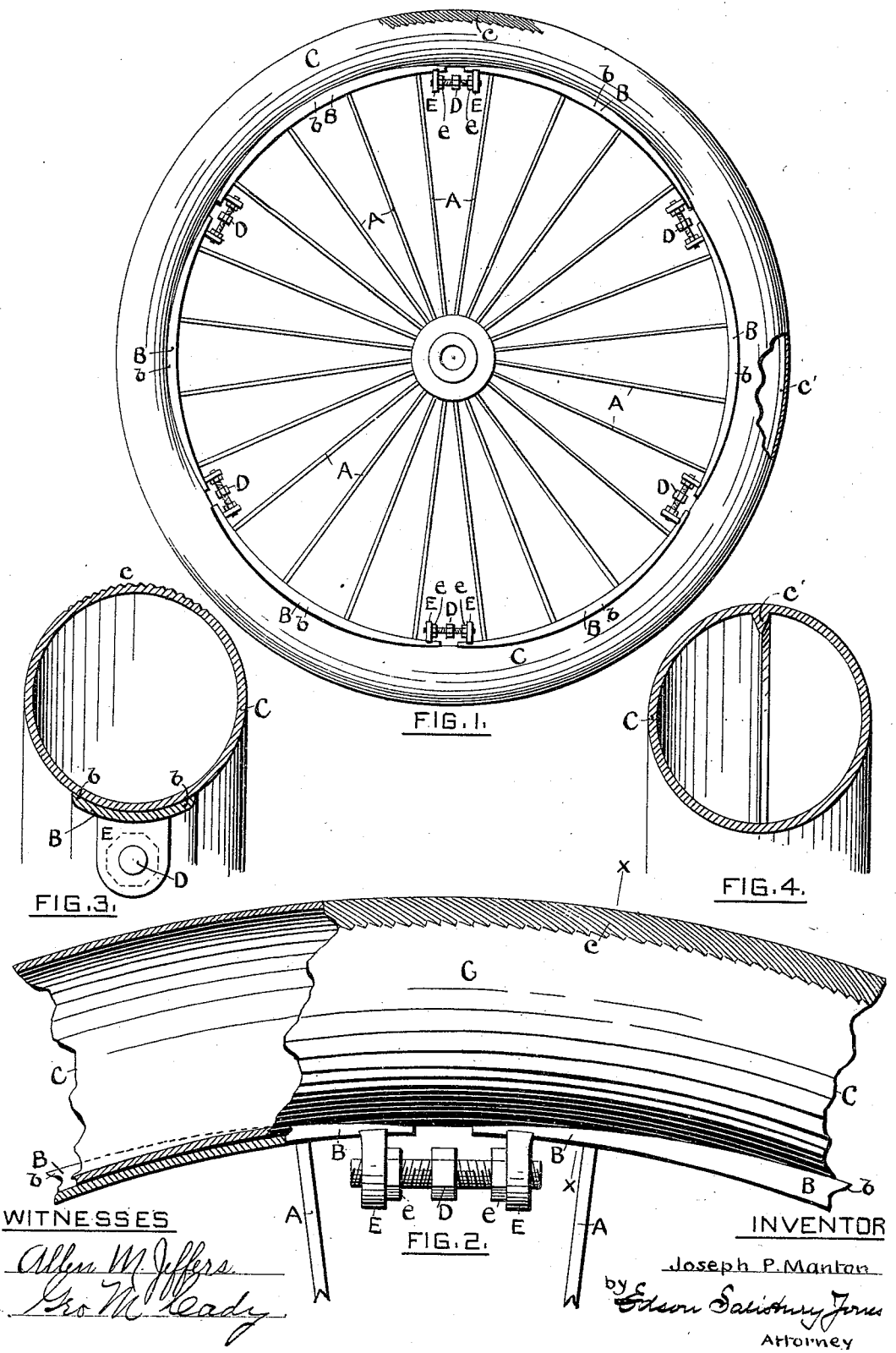

JOSEPH P. MANTON, OF PROVIDENCE, RHODE ISLAND.

VEHICLE-WHEEL.

SPECIFICATION forming part of Letters Patent No. 494,584, dated April 4, 1893.

Application filed August 22, 1892. Serial No. 443,779. (No model.)

*To all whom it may concern:*

Be it known that I, JOSEPH P. MANTON, of the city and county of Providence and State of Rhode Island, have invented certain new and useful Improvements in Wheels for Vehicles; and I do hereby declare the following specification, taken in connection with the accompanying drawings, forming a part of the same, to be a description thereof.

The invention relates particularly to wheels for bicycles and trotting sulkies, where lightness in weight is desirable, and it consists in certain features of construction and arrangement hereinafter described and claimed.

The main objects of the improvements are to provide a tire for the wheel, which will conduce to easy riding and speed, by having elasticity and lightness, and the further advantage of non-liability to easy puncture; and so to construct the felly of the wheel that the tire can be readily applied and be tightened from time to time should occasion require.

In the drawings, Figure 1 represents a side view of a wheel embodying the invention. Fig. 2 shows on a larger scale a side view and partial section of a portion of the felly and tire. Fig. 3 represents a cross-section of the same on line $xx$ of Fig. 2. Fig. 4 shows a cross-section of the tire provided with an interior, annular, reinforcing-rib.

A are the spokes of the wheel, which are preferably of wire.

B is the felly, and C is the tire. The tire is in the form of a metallic tubular ring, and is preferably composed of aluminium of the proper thickness to secure elasticity, lightness, and non-liability to easy puncture. The tread surface of the tire may be smooth, but to give it a better hold I prefer to corrugate it, as shown at, $c$, Figs. 1, 2 and 3, and thereby reduce to a minimum all liability to slip. In certain classes of tires, also, I prefer to provide the interior of the tubular tire with an annular reinforcing rib, $c'$, Figs. 1 and 4, which will increase the strength of the tread portion and its resistance to damage.

The felly, B, is made in sections, which are curved crosswise, or otherwise constructed to produce flanges, $b$, at the sides, as shown in Figs. 1, 2 and 3. These felly-sections are attached to the spokes A, in any proper manner, and suitable means are provided for connecting the ends of adjacent sections to each other and so that the diameter of the felly can be contracted and expanded. The means shown consist of right-and-left-hand screws D, having a central portion adapted to receive a wrench, which screws are threaded into ears, E, projecting inwardly from near the ends of the felly-sections, check-nuts, $e$, preferably being employed to hold the screws in adjusted positions.

When the tire, C, is to be applied, the screws D are adjusted so as to contract the diameter of the felly, and the tire is sprung on the felly, the spokes A, being slightly sprung at the same time. The screws D are then turned in the opposite direction to tighten the felly securely upon the tire, when the check-nuts, $e$, are set up against the ears E, and the operation is completed. As the contracting action of the screw reduces the diameter of the felly the most at points midway between the ends of the sections, I prefer, in order that the tire may be the more easily applied, gradually to reduce the height of the edges or flanges, $b$, from the center of a felly-section toward its ends, as shown in Figs. 1 and 2.

What I claim, and desire to secure by Letters Patent, is—

1. In a vehicle wheel the combination of an outwardly-flanged felly made in sections, and provided with means substantially as described for connecting the adjacent ends of said sections and for contracting and expanding the diameter of the felly; and a tubular metallic tire mounted on the felly, substantially as set forth.

2. In a vehicle wheel, the combination of an outwardly-flanged felly made in sections, and having means substantially as described for connecting said sections with each other and for increasing and diminishing the diameter of the felly; and a tubular aluminium tire mounted on the felly, substantially as set forth.

3. In a vehicle wheel, the combination of an outwardly flanged felly made in sections and having means substantially as described for connecting said sections and for decreasing and increasing the diameter of the felly; and a tubular metallic tire mounted on the felly and having its tread surface corrugated, substantially as set forth.

4. In a vehicle wheel, the combination of an outwardly-flanged felly made in sections and having means substantially as described for connecting said sections and for decreasing and increasing the diameter of the felly; and a tubular metallic tire mounted on the felly and provided with the interior reinforcing rib, $c'$, substantially as set forth.

5. In a vehicle wheel, the combination of an outwardly-flanged felly made in sections and having means substantially as described for connecting said sections and for decreasing and increasing the diameter of the felly; and a tubular metallic tire mounted on the felly and having its tread surface corrugated and its interior furnished with the reinforcing rib, $c'$, substantially as set forth.

6. A vehicle wheel having an outwardly flanged felly made in sections and provided with means substantially as described for connecting said sections to each other and for diminishing and increasing the diameter of the felly, the flanges on the felly-sections being gradually reduced in height from the center of the sections toward their ends, substantially as set forth.

7. A vehicle tire of aluminium in the form of a tubular ring and having its tread-surface corrugated, substantially as set forth.

8. A vehicle tire of aluminium in the form of a tubular ring and having the interior, annular, reinforcing rib, $c'$, substantially as set forth.

JOSEPH P. MANTON.

Witnesses:
EDSON SALISBURY JONES,
GEORGE M. CADY.